United States Patent
Rosner et al.

(10) Patent No.: US 7,047,395 B2
(45) Date of Patent: May 16, 2006

(54) REORDERING SERIAL DATA IN A SYSTEM WITH PARALLEL PROCESSING FLOWS

(75) Inventors: Roni Rosner, Binyamina (IL); Micha G. Moffie, Caesarea (IL); Abraham Mendelson, Haifa (IL)

(73) Assignee: Intel Corporation, Santa Clara, CA (US)

( * ) Notice: Subject to any disclaimer, the term of this patent is extended or adjusted under 35 U.S.C. 154(b) by 594 days.

(21) Appl. No.: 10/007,981

(22) Filed: Nov. 13, 2001

(65) Prior Publication Data

US 2004/0221138 A1  Nov. 4, 2004

(51) Int. Cl.
*G06F 15/00* (2006.01)
(52) U.S. Cl. .................. 712/218; 712/215; 712/28
(58) Field of Classification Search ............ 712/215, 712/218, 28
See application file for complete search history.

(56) References Cited

U.S. PATENT DOCUMENTS 5,398,321 A * 3/1995 Jeremiah ............... 712/216
5,499,349 A * 3/1996 Nikhil et al. ............ 712/26
5,724,565 A * 3/1998 Dubey et al. ........... 712/245
6,240,509 B1 * 5/2001 Akkary ................. 712/228

OTHER PUBLICATIONS

Patterson, David A. and John L. Hennessy. Computer Architecture A Quantitative Approach. 1996. Morgan Kaufmann Publishers, Inc. Second Edition. pp. 166-167, 173-174.*

* cited by examiner

*Primary Examiner*—Dov Popovici
*Assistant Examiner*—Tonia L. Meonske
(74) *Attorney, Agent, or Firm*—Blakely, Sokoloff, Taylor & Zafman LLP (57) ABSTRACT

A distributed system is provided for apportioning an instruction stream into multiple segments for processing in multiple parallel processing units, and for merging the processed segments into a single processed instruction stream having the same sequential relative order as the original instruction stream. Tags may be attached to each segment after apportioning to indicate the order in which the various segments are to be merged. In one embodiment, the end of each segment includes a tag indicating the unit to which the next instruction in the original instruction sequence is directed.

27 Claims, 5 Drawing Sheets

REORDERING SERIAL DATA IN A SYSTEM WITH PARALLEL PROCESSING FLOWS

BACKGROUND OF THE INVENTION

1. Field of the Invention

The invention pertains generally to computers. In particular, the invention pertains to parallel processing.

2. Background of the Invention

Some conventional processors include multiple parallel processing units to increase overall processing throughput. A stream of sequential instructions to be executed is segmented into groups, with each group going to one of the multiple parallel processing units for further processing. The outputs of the multiple processing units are then combined into a single sequence in the same order that would have been achieved if a single processing unit had executed all instructions in their original order. Since this technique allows multiple instructions to be executed simultaneously, the overall instruction throughput may be several times higher than it would be if all instructions were being executed sequentially in a single processing unit.

Because the instructions in the different processing units may execute at different rates, the outputs of the different processing units may be available in a different order than the original instruction sequence. A mechanism merges the outputs from the various processing units into a single stream that reflects the original instruction sequence. This merging of multiple out-of-order results into the original order is frequently referred to as instruction reordering or as preserving program-order semantics. Conventional methods for merging the multiple parallel instruction streams involve the use of a central component to keep track of the instructions as they flow through the parallel processing units. This approach typically requires design complexity that substantially increases with increased parallelism. Increased design complexity translates into other problematic factors that may include larger circuit implementation area, increased power consumption, longer development time, and more difficult validation of the functionality.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Various embodiments of the invention provide for apportioning a single stream of data elements into multiple segments (that is, dividing into segments and assigning those segments), where each segment includes one or more consecutive data elements from the original single stream. The segments may then be processed in parallel (that is, at the same time or overlapping times by different processing units). Before processing, information may be inserted into each segment indicating the intended relative order of the various segments after processing. The information may be preserved in the segments during processing, and may be later used to reconstruct the intended order without the need for a centralized component to keep track of ordering information. In some of the embodiments described, the data elements are instructions and the processing units are instruction execution units. However, other types of data elements and processing units may be included within the scope of the invention.

Figure 1:
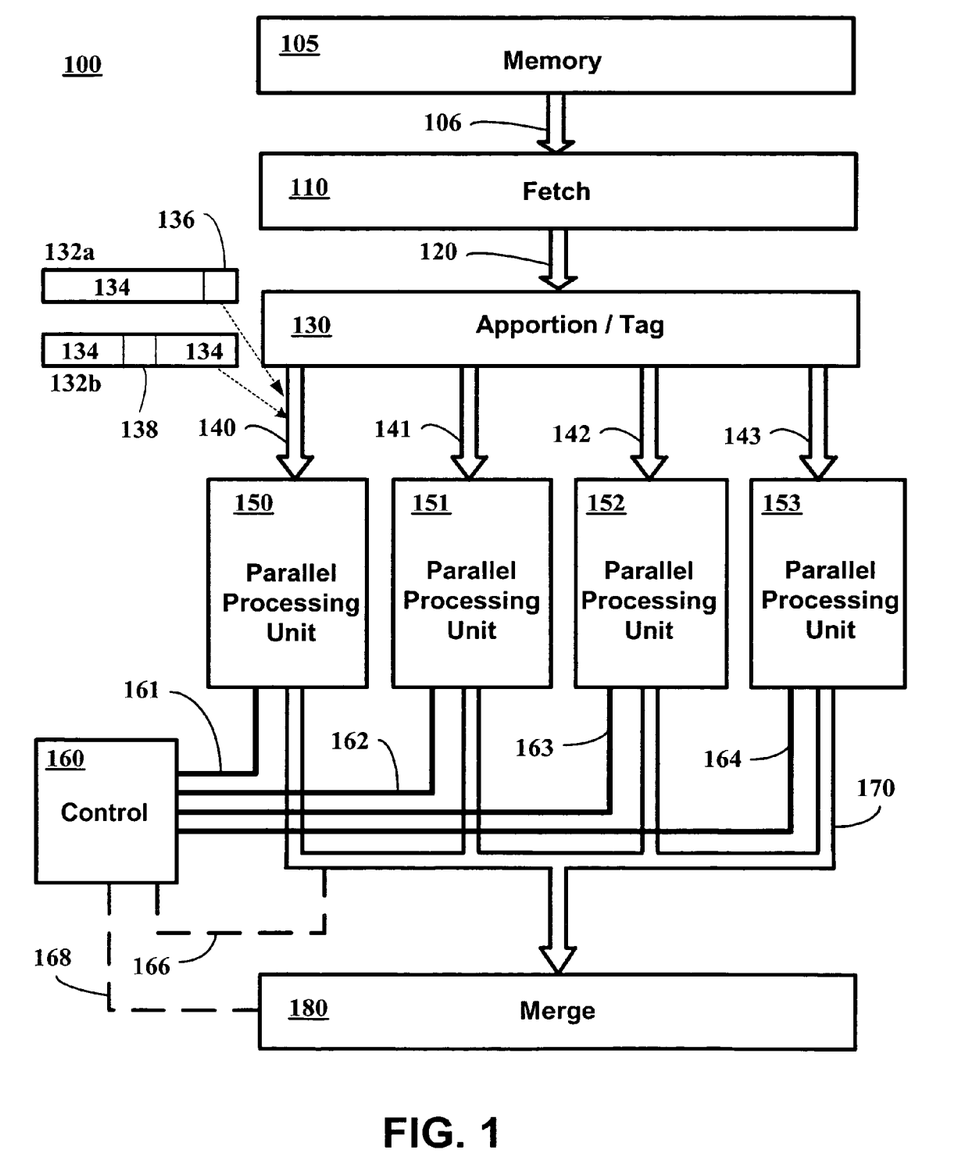
FIG. 1 is a block diagram of a system with a single input stream and a single output stream, according to one embodiment of the invention.

FIG. 1 is a block diagram of a system with a single input stream and a single output stream, according to one embodiment of the invention. In the illustrated embodiment of FIG. 1, a system 100 includes a memory 105, a fetch unit 110, an apportion/tag unit 130, multiple parallel processing units 150–153, control unit 160, and merge unit 180. In the illustrated embodiment, memory 105 contains instructions to be processed and the fetch unit 110 retrieves those instructions over path 106 (which may be a memory bus). Fetch unit 110 may provide a single stream of instructions which is then apportioned into segments by apportion/tag unit 130. A segment may be one or more sequential instructions from the single instruction stream in the same order as in the single instruction stream. Each segment may be tagged by apportion/tag unit 130 to identify the next segment in the sequential order. The segments are distributed to parallel processing units 150–153 for processing according to the apportionment. In one embodiment, each of parallel processing units 150–153 can process instructions or other data independently of the other parallel processing units. In one embodiment, all of parallel processing units 150–153 are operationally identical. Although four parallel processing units 150–153 are depicted in FIG. 1 for simultaneous processing of up to four segments, one skilled in the art will recognize that other quantities of parallel processing units may be used. After the instructions in the segments are processed, the results (e.g., processed instructions) from parallel processing units 150–153 are merged together by control unit 160 into a single stream again in merge unit 180.

Individual instructions may be fetched from memory 105 by fetch unit 110 and provided to apportion/tag unit 130 in the intended order. In one embodiment, the intended order is the actual order the instructions would be executed if executed sequentially by a single execution unit, and is the same as the original order in which the instructions were fetched. In one embodiment, the intended order is the predicted order of execution if the instructions were executed sequentially by a single execution unit. For more efficient throughput, branch prediction logic (not shown) may attempt to predict the outcome of each branch instruction so the following instructions may be fetched and loaded into the parallel processing units 150–153 before the branch instruction is actually executed. Each instruction may be associated with an address (physical or virtual), which is part of the function determining its relative position in the sequence.

In operation, the intended order may be dynamic as a result of miss-predicted branches, task switches, power-downs and other operations that cause various instruction sequences in processor 100 to be purged and result in a change in the predicted order instructions are expected to be executed. Likewise, each continuous instruction stream may include gaps and at times fragments of the stream may be purged, and different instructions fetched and loaded in their place.

In one embodiment, unit 130 apportions the single instruction stream from fetch unit 110 into segments. Each segment is then transferred over one of paths 140–143 to a respective one of the parallel processing units 150–153. In one embodiment, a segment includes only a single instruction. In another embodiment, a segment includes a group of consecutive instructions, such as a cache line, a basic block or a trace, from the original single instruction stream. In one embodiment, a basic block is a sequence of instructions in which only the last instruction, if any, is a branch instruction. A trace may be comprised of several basic blocks that follow sequentially during some portion of the program execution.

In one embodiment, apportionment is based on which parallel processing units are not currently busy. In one embodiment, each parallel processing unit includes a first-in first-out (FIFO) buffer to hold instructions waiting to be processed, and apportionment is based on which FIFOs have the space to accept another segment.

Apportion/tag unit 130 may selectively insert tags into each of the segments. Tags include information that identify the next segment, so that the tags enable a chain of segments, processed in different parallel processing units, to be reconstructed into the intended order. One embodiment provides for tags to be inserted only at the end of each segment. In one embodiment, each branch instruction is the last instruction in a segment. Accordingly, one embodiment for apportioning a single instruction stream into multiple segments terminates a segment when a branch instruction is encountered, and tags that branch instruction with information identifying the next segment. In one embodiment, the tag indicates which parallel processing unit is to process the next segment.

As the original instruction stream is apportioned to form multiple segments, apportion/tag unit 130 may need to examine the next instruction in the original instruction stream prior to determining whether a particular instruction requires a tag. In the event of a delay in receiving the next instruction, the current instruction may be routed to the selected parallel processing unit 150–153 without a tag and, if it is later determined that a tag is needed, one may be inserted with a dummy instruction (i.e., an instruction which if executed does not cause an actual operation to be performed).

In one embodiment a tag may be attached to an instruction, for example by attaching one or more bits to the instruction. For example, instruction stream 132a consists of instruction data 134 and tag 136 attached to the end of instruction data 134. An embodiment with two parallel processing units may efficiently employ a single logic bit attached to each instruction to indicate the switching points, allowing for a simple decode mechanism such as a single logic gate to interpret the tags. Tag 136 may be a single logic bit. In another embodiment, such as in instruction stream 132b, a tag 138 may be inserted into a parallel instruction stream as a separate element such as a dummy instruction containing tag bits. Tag 138, for example, is located between two separate instructions 134. Still another embodiment may utilize both types of tags. One skilled in the art will recognize that tags may be added or encoded into the instruction stream in other ways without deviating from the sprit of the invention.

In the embodiment of FIG. 1, each parallel processing unit 150–153 receives one of the multiple segments through a respective one of paths 140–143. Instructions may be stored by each parallel processing unit 150–153 as they are received and selectively emitted after each instruction is processed. In one embodiment, each parallel processing unit 150–153 may employ one or more FIFO data queues to store instructions before processing, after processing, or both before and after processing. A particular embodiment may employ parallel processing units 150–153 that operates on each received instruction by transforming each received instruction into one or more micro-instructions. Each parallel processing unit 150–153 may process instructions out of order internally, but provide results in order at the output of the parallel processing unit.

In the embodiment depicted in FIG. 1, four different segments may be passed through the four parallel processing units 150–153 and merged on path 170 to form a single instruction stream, which is received by a merge unit 180. Control unit 160 is coupled to each parallel processing unit 150–153 through a respective one of the paths 161–164 to select any one of the parallel processing units 150–153 to emit an instruction onto path 170. Control unit 160, by directing the order instructions are emitted from the aggregate of pipeline units 150–153, forms a single instruction stream having the intended order on path 170.

In the embodiment depicted in FIG. 1, control unit 160 is coupled to monitor the processed instruction stream for tags, and decode each of the tags as they are detected. In various embodiments, control unit 160 may sample the tags within each of the parallel processing units 150–153 (through respective paths 166–164), while the tags are driven onto shared path 170 (through optional path 166) or after the tags are received by the merging pipeline unit 180 (through optional path 168). Control unit 160 may decode the received tags to determine which of the parallel processing units 150–153 is to be selected next to emit instructions. In one embodiment, the tags are discarded after they are used for merging.

In operation, control unit 160 may initially select one of the processing units 150–153 as a default unit to emit a processed instruction. Thereafter, the selected processing unit continues to emit processed instructions, in the sequential order the instructions were received, until a tag is encountered. Each tag directs the control unit 160 to select a specified one of the parallel processing units 150–153 to emit the next one or more processed instructions. In this manner, the processed instructions may be recombined into their original order.

In one embodiment, merge unit 180 may be a retirement stage that collects processed instruction from all parallel processing units through path 170 and is required to commit their outcome in the original fetch order. The intended order in this specific embodiment is the original fetch order.

The embodiment depicted by FIG. 1 provides for a single instruction stream to be formed on a shared path 170. Another embodiment may use the information conveyed by the tags to determine where to route the instructions in each segment through multiple output paths.

Figure 2:
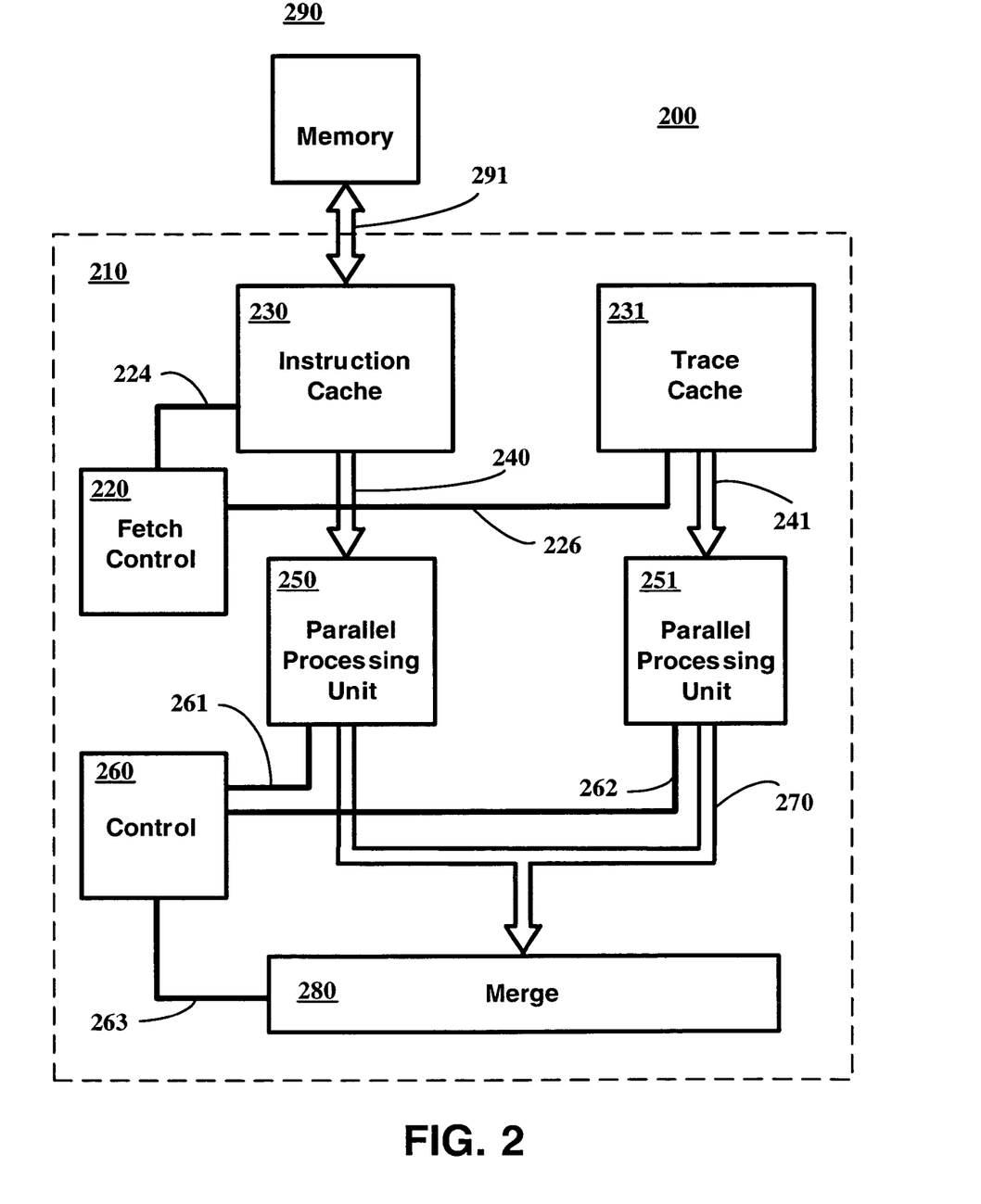
FIG. 2 is a block diagram of a system with multiple input streams and a single output stream, according to one embodiment of the invention.

FIG. 2 is a block diagram of a system with multiple input streams and a single output stream, according to one embodiment of the invention. In the illustrated embodiment of FIG. 2, program instructions may be fetched from a memory 290 and loaded by merge unit 280 into a processor pipeline to be processed and queued to be executed by an execution unit. For efficient operation a continuous stream of instructions can be loaded and processed so that the execution unit rarely has to wait for instructions. Increased efficiency can be achieved by loading instructions fetched from memory 290 into an instruction cache unit 230 for faster subsequent retrieval. Additionally, increased efficiency may be obtained by utilizing a trace cache unit 231. Trace cache unit 231 stores trace blocks, which are sequences of instructions that are built as a program is executed. Instructions may be preprocessed prior to storage in the trace cache.

In one embodiment, instructions are fetched in the predicted execution order from two alternate parallel fetch mechanisms: the trace cache unit 231 and the instruction cache unit 230. A sequence of instructions fetched from the instruction cache unit 230 may form one segment of instructions which is processed by parallel processing unit 250, while a sequence of instructions fetched from the trace cache unit 231 may form another segment of instructions which is processed by parallel processing unit 251. The two segments may be merged on shared path 270 to form a single instruction stream that has a desired sequential order that preserves program order semantics.

In one embodiment, fetch control 220 determines the predicted execution order of instructions and is responsible for loading instructions into the processor pipeline in the predicted execution order to be processed and merged. Fetch control 220 is coupled to the instruction cache unit 230 through path 224 and trace cache unit 231 through path 226 to direct which specific instructions are to be fetched and the sequential order instructions are to be transferred to the respective parallel processing units 250, 251 over paths 240, 241. The duration of time for processing instructions by the parallel processing units 250, 251 may vary substantially for each of the two parallel processing units 250, 251. In a particular embodiment, instructions fetched from the trace cache unit 231 are processed faster than those fetched from the instruction cache unit 250.

In operation, fetch control unit 220 may repeatedly switch back and forth between fetching instructions from the instruction cache unit 230 and fetching instructions from the trace cache unit 231. Fetch control unit 220 predicts the execution order of instructions and the source of the next group of instructions before the execution of the current instruction flow has completed.

In the embodiment illustrated in FIG. 2, control unit 260 is responsible for merging the two segments of instruction streams transferred from the two parallel processing units 250, 251 to form a single instruction stream which is transmitted through path 270 to the merging stage 280, so that instructions are received sequentially by the merging stage 280 in the predicted execution order.

In one embodiment, in order to deliver the instructions in the predicted execution order, control unit 260 identifies the switching points in each of the parallel instruction streams. At each switching point the fetch control unit 220 causes a tag to be inserted. A tag may be inserted either with or after the last instruction in a segment, with the tag indicating which parallel processing unit contains the next instruction in the predicted execution order.

Control unit 260 is coupled to each parallel processing unit 250, 251 through a respective one of the paths 261, 262 to selectively direct any one of the two parallel processing units 250, 251 to emit instructions. Each emitted instruction is transferred along path 270 and received by the merging stage 280, and may be stored temporarily in a write buffer (not shown). Control unit 260, in this exemplary embodiment, is coupled to the merge unit 280 through path 263 to monitor tags received with instructions and stored in the write buffer. Control unit 260 may be integrated into the merge unit 280 and employ a state machine. Other embodiments may have the control unit 260 coupled to the output queue of each pipeline unit 250, 251 or coupled to path 270, as previously described for the embodiments shown in FIG. 1.

In operation, a default one of the parallel processing units 250, 251 can be initially selected by the control unit 260 to emit processed instructions. Thereafter, the particular pipeline buffer to be selected can be determined by monitoring the tags attached to emitted processed instructions. Each emitted processed instruction is transmitted through path 270 and is received by the merge unit 280 where control unit 260 may consult it to determine if it includes a tag. If the emitted instruction does not have a tag, the previously selected pipeline unit 250, 251 is selected again, by control unit 260 to emit an instruction. If the emitted instruction does have a tag, then the other one of the two parallel processing units 250, 251 may be selected by control unit 260 to emit an instruction.

By way of example, a first group of instructions may be retrieved from the instruction cache unit 230 and transferred to parallel processing unit 250 followed by a second group of instructions fetched from the trace cache unit 231. The last instruction (the switch point) of the first group transferred from the instruction cache unit 230 may be tagged to indicate that the next group of instructions are to be retrieved from the trace cache unit 231. The second group of instructions fetched from the trace cache unit 231, may start to arrive at the merge unit 280 while or before the first group has been emitted from the write queue and transmitted through path 270 to be received by the merge unit 280. The second group can be blocked, by the control unit 260, until the last instruction in the first group fetched from the instruction cache unit 230 is retired. Only when the tag is encountered, the second group of instructions originating from the trace cache unit 231 may begin to be emitted and may be transmitted through path 270 to the merge unit 280.

Figure 3:
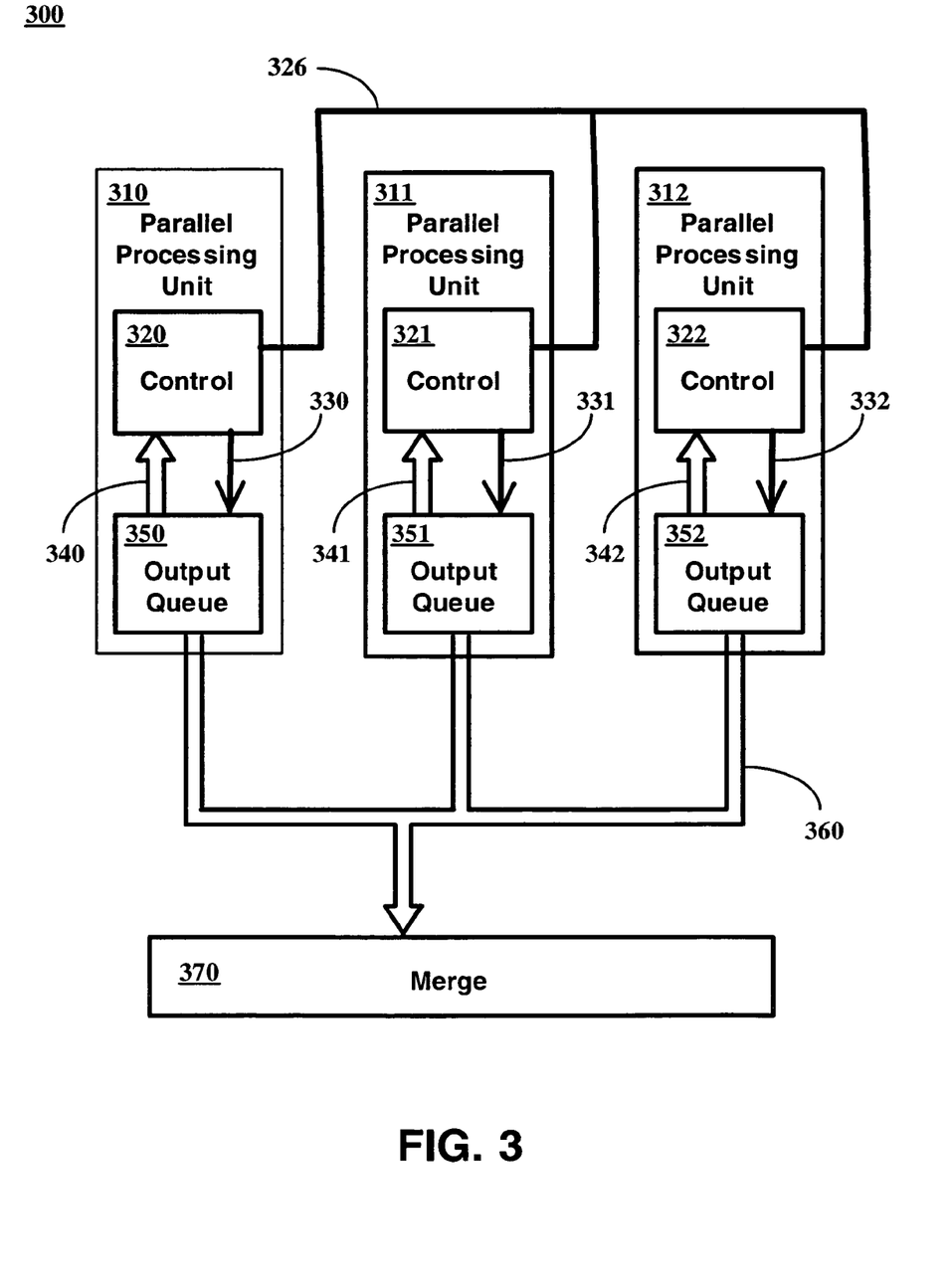
FIG. 3 is a block diagram of a system with distributed control units, according to one embodiment of the invention.

FIG. 3 is a block diagram of a system with distributed control units, according to one embodiment of the invention. In the illustrated embodiment of system 300 in FIG. 3, each of parallel processing units 310–312 includes a separate control unit 320–322, respectively, and a separate output queue 350–352, respectively. Although three parallel processing units 310–312 are shown, the methods and apparatus shown may apply to any number of multiple parallel processing units.

In the embodiment of FIG. 3, each parallel processing unit 310–312 includes a respective output queue 350–352 to store processed instructions before they are emitted. In one embodiment, output queues 350–352 are FIFOs. Instructions are selectively emitted from each of the output queues 350–352 in order and transmitted through path 360 to be received by merge unit 370. In one embodiment, a previous pipeline stage (not shown) provides a respective one of three parallel instruction streams, or segments, to each of the three parallel processing units 310–312. Tags are inserted into each segment to indicate the desired intended order the instructions are to be emitted from the aggregate of three parallel processing units 310–312. In this specific embodiment, tags are inserted at switching points and indicate the particular parallel processing unit 310–312 that is to be selected next. Tags may be inserted with an instruction or as a separate element in each of the parallel instruction streams.

The distributed control units 320–322 may collectively coordinate control to direct the aggregate of parallel processing units 310–312 to emit instructions in the intended order. Each of the illustrated distributed control units 320–322 is coupled through a respective path 330–332 to an associated one of the output queues 350–352 to selectively direct the respective output queue 350–352 to emit an instruction. Each emitted instruction is removed from the output queue 350–352 and transferred through path 360 to the merge unit 370. Tags may be removed by the parallel processing units 310–312 and not emitted with instructions.

In one embodiment, only one distributed control unit 320–322 is in an active state at any one time to direct instructions to be emitted from its associated output queue. Distributed control units 320–322 may be coupled to each other through path 326 to determine which of the distributed control units 320–322 is to be in an active state at any particular time. Each distributed control unit 320–322 is coupled to its associated output queue 350–352 to monitor and decode any tags therein. Each distributed control unit 320–322 that is currently in an active state may decode a tag included with the next instruction to be emitted to determine which one of the distributed control units 320–322 is next to enter an active state.

In the operation of one embodiment, the first of the distributed control units 320–322 to receive an instruction, for example 320, may inform the other distributed control units 321–322 and enter an active state. Distributed control unit 320 directs its associated output queue 350 to emit instructions in the sequential order the instructions were received until a tag is encountered. The tag is decoded by the active distributed control unit 320 to determine which one of the other distributed control units 321–322 is to be selected next to enter an active state. If the tag is attached to an instruction, then the active distributed control unit 320 directs the tagged instruction to be emitted with the tag stripped from the instruction. If the tag is not associated with an instruction, the distributed control unit 320 may purge the tag from the respective output queue 350 so that it is not emitted. Distributed control unit 320 directs the particular distributed control unit that is identified by the tag to enter an active state, which for example may be distributed control unit 321. Embodiments where the tag is a separate data element may be implemented such that the distributed control units 320–322 may consult the second next data element waiting in the queue to be emitted.

Figure 4:
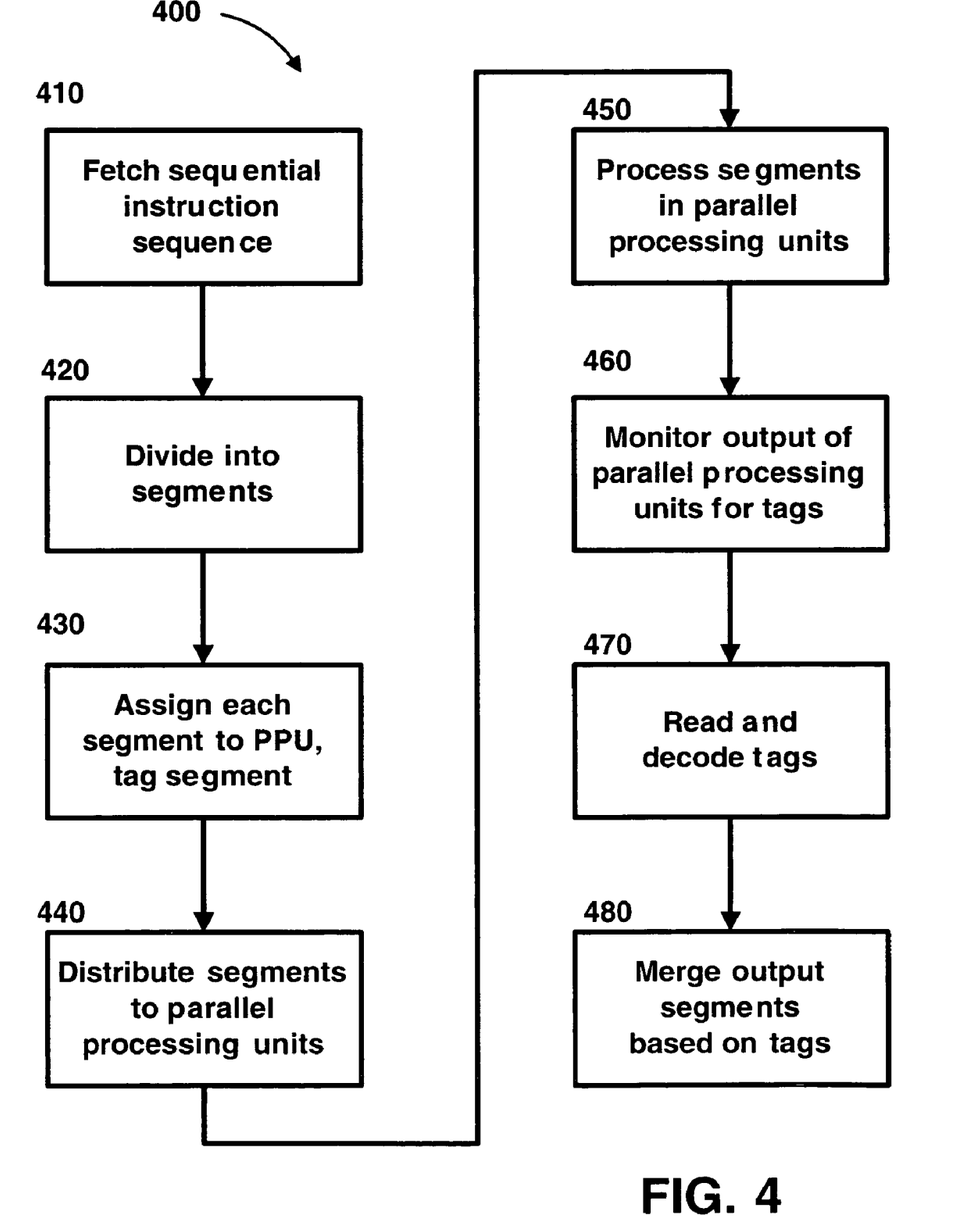
FIG. 4 is a system-level flow diagram of a method according to one embodiment of the invention.

FIG. 4 is a flow diagram of a method according to one embodiment of the invention. The method illustrated by flow chart 400 may be implemented by any of the embodiments previously discussed. At block 410, a sequence of instructions is fetched, and at block 420 that sequence is divided into segments. A segment may be a group of sequential instructions that is a subset of the fetched sequence. In one embodiment, each segment is the same length. In another embodiment, the end of the segment is determined by where logical switch points, such as branch instructions, are encountered in the sequence. At block 430, each segment is assigned to a particular parallel processing unit for processing, and a tag is added to each segment to aid in identifying the following segment in the sequence. In one embodiment, the tag identifies which parallel processing unit the next segment is assigned to. At block 440, each segment is distributed to its assigned parallel processing unit, where the segment is processed at block 450. In one embodiment, the distribution and process operations of blocks 440, 450 are performed on each individual instruction as that instruction is encountered.

After being processed, each instruction is ready to be merged with the other processed instructions in the intended order, and the information in the tags enables this. At block 460, a control unit monitors the processed instructions for tags. This monitoring may take place in any of the previously described ways. In one embodiment, the control unit monitors the output of the currently active parallel processing unit (the unit which is currently emitting processed instructions). When a tag is found, the tag is read and decoded at block 470. Based on the contents of the tag, another parallel processing unit is selected to emit processed instructions. By repeatedly switching which parallel processing unit is emitting processed instructions, based on the tags found in the currently active parallel processing unit, the output segments may be merged together in their intended order at block 480.

Figure 5:
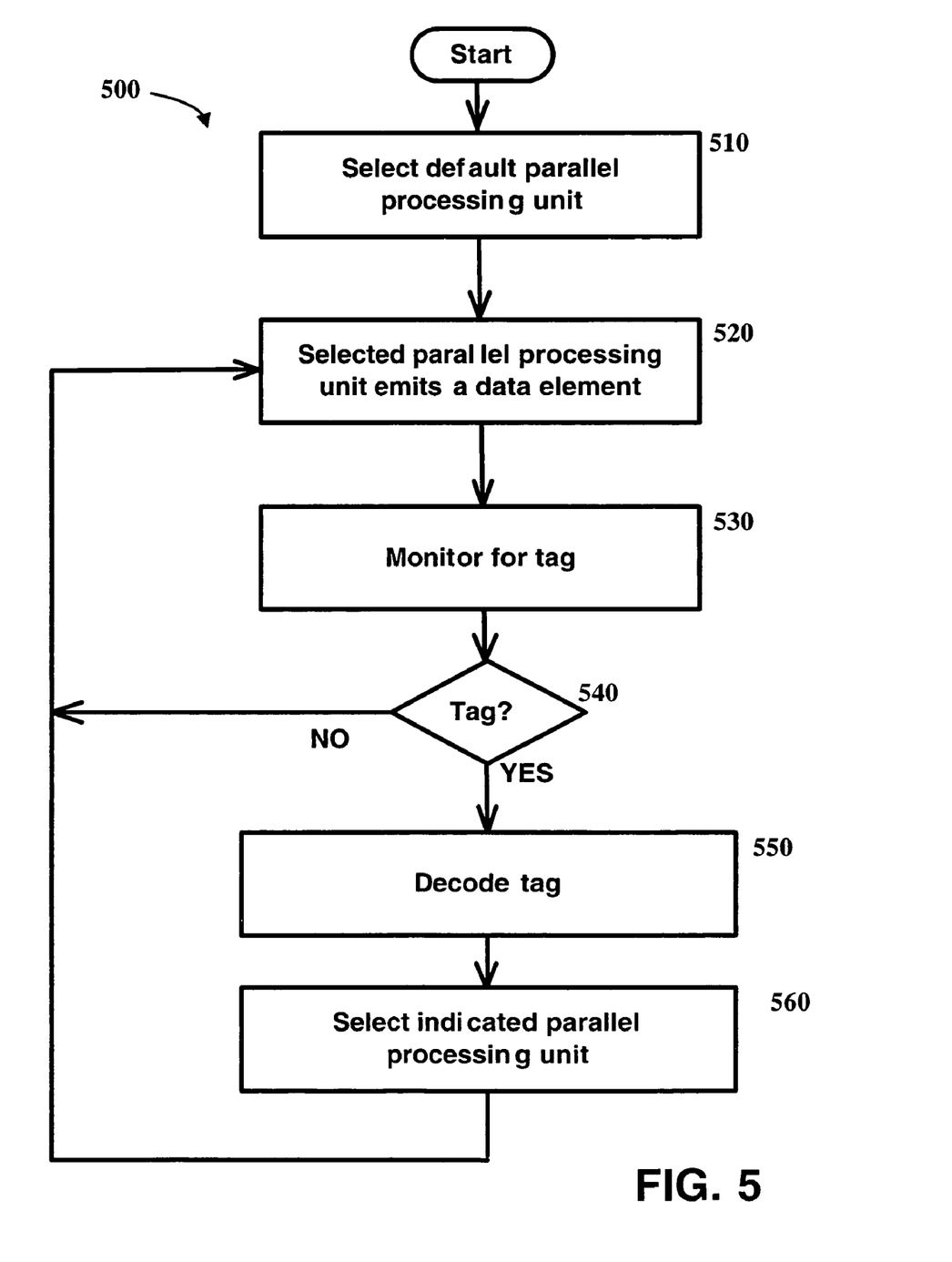
FIG. 5 is a more detailed flow diagram of a merging method according to one embodiment of the invention.

FIG. 5 is a flow diagram of a method according to one embodiment of the invention. The method illustrated by flow chart 500 may be implemented by control unit 160 of FIG. 1 and/or by control unit 260 of FIG. 2 to merge the output of multiple parallel processing units. One skilled in the art will recognize that the method may be applied to merge two, three or more parallel instruction streams based on tags contained in the instructions streams. Tags may be attached to an instruction or may be a separate element.

At block 510, a default parallel processing unit is selected from the available parallel processing units. This may occur at each system reset or pipeline purge, but it may also be initiated at any time by a global controller (not shown). At block 520 the selected parallel processing unit emits a processed data element. At block 530, the control unit monitors for a tag. The tag may be part of the emitted data element, or may follow it. If no tag is found at block 540, control returns to block 520, where the same selected parallel processing unit emits the next data element from its output. Control may loop through blocks 520, 530, 540 as long as no tag is found. However, when a tag is found, the tag is decoded at block 550 to determine which parallel processing unit contains the next data element to be emitted. In one embodiment, this might be any of the parallel processing units, including the one currently selected. At block 560, the indicated parallel processing unit is selected, while the remaining parallel processing units are de-selected. Then control returns to block 520 to cause the selected parallel processing unit to emit the next data element.

The invention may be implemented in one or a combination of hardware, firmware, and software. The invention may also be implemented as instructions stored on a machine-readable medium, which may be read and executed by at least one processor or state machine to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

In one embodiment, one or more of control units 160, 260, 320–322 may be implemented by processors or state machines. In one embodiment, the instructions and/or code to implement the operations described herein by any of control units 160, 260, 320–322 may cause the following: 1) selecting one of multiple parallel processing units to output a current processed instruction stream, 2) monitoring the processed instruction stream to detect a tag, 3) decoding the detected tag to determine which of the multiple parallel processing units to select to output a next processed instruction stream. In embodiments illustrated in FIGS. 1 and 2, a single control unit may monitor the processed instruction streams of multiple parallel processing units. In the embodiment of FIG. 3, each parallel processing unit may have its own separate control unit.

The foregoing description is intended to be illustrative and not limiting. Variations will occur to those of skill in the art. Those variations are intended to be included in the invention, which is limited only by the spirit and scope of the appended claims.

We claim:

1. An apparatus, comprising:
   a plurality of parallel processing units to process data elements;
   an apportion/tag unit coupled to the plurality of parallel processing units:
      to separate a serial data element stream having an original order into a plurality of segments;
      to assign each of the plurality of segments to one or more of the plurality of parallel processing units for processing; and
      to insert a tag in each segment indicating which parallel processing unit contains the next segment in the original order; and
   a control unit coupled to the plurality of parallel processing units to merge the plurality of segments after processing into the original order based on the tag.

2. The apparatus of claim 1, wherein the tag is attached to a particular data element in the plurality of segments.

3. The apparatus of claim 1, wherein the tag is attached to a final data element in the plurality of segments.

4. The apparatus of claim 3, wherein the final data element is a branch instruction.

5. The apparatus of claim 1, wherein the tag is separate from any data element in the plurality of segments.

6. The apparatus of claim 5, wherein the tag is behind a final data element in the plurality of segments.

7. The apparatus of claim 6, wherein the final data element is a branch instruction.

8. The apparatus of claim 1, wherein the control unit is to monitor an output of said plurality of parallel processing units for the tag.

9. The apparatus of claim 1, wherein:
   the plurality of parallel processing units are to produce processed data elements from the plurality of segments; and
   the control unit is to monitor each of the processed data elements for the tag.

10. The apparatus of claim 1, wherein:
    the data elements include instructions; and
    each of the plurality of parallel processing units is an instruction processing unit.

11. The apparatus of claim 1, wherein the original order is a predicted order.

12. An apparatus, comprising:
    a plurality of parallel processing units;
    a fetch unit coupled to the plurality of parallel processing units to:
       fetch a plurality of segments of instructions from a plurality of storage units for processing in the plurality of parallel processing units; and
       insert a tag in each segment of the plurality of segments indicating which parallel processing unit contains the next segment in an intended order of the segments; and
    a control unit coupled to the plurality of parallel processing units to merge the plurality of segments in the intended order after the processing.

13. The apparatus of claim 12, wherein at least one of the plurality of segments is a trace block.

14. The apparatus of claim 12, wherein the tag is one of:
    at least one bit added to a final instruction in each of the plurality of segments; and
    a separate entry behind the final instruction.

15. The apparatus of claim 14, wherein the final instruction is a branch instruction.

16. The apparatus of claim 12, wherein the control unit is to monitor an output of the plurality of parallel processing units for the tag.

17. The apparatus of claim 12, wherein the intended order is a predicted order.

18. A method, comprising:
    separating a serial data element stream having an original order into a plurality of segments;
    assigning each of the plurality of segments to one or more parallel processing units of a plurality of parallel processing units for processing;
    inserting a tag in each segment indicating which parallel processing unit contains the next segment in the original order; and
    merging the plurality of segments into the original order after processing based on the tag.

19. The method of claim 18, wherein said inserting the tag includes performing one of:
    attaching the tag to a final data element in each of the plurality of segments; and placing the tag after the final data element.

20. The method of claim 19 wherein the final data element is a branch instruction.

21. The method of claim 18, wherein said merging includes monitoring an output of the plurality of parallel processing unit for the tag.

22. A system comprising:
    a memory;
    a fetch unit coupled to the memory to fetch data elements from the memory;
    a plurality of processing units to process the data elements;
    an apportion/tag unit coupled to the fetch unit and to the plurality of processing units to:
       separate a serial data element stream into a plurality of segments;
       assign each of the plurality of segments to one or more of the plurality of processing units for processing; and
       insert a tag in each segment indicating which processing unit contains the next segment in an intended order of the segments; and
    a control unit coupled to the plurality of processing units to merge the plurality of segments after processing into the intended order based on the tag.

23. The system of claim 22, wherein the tag is at an end of each of the plurality of segments.

24. The system of claim 22, wherein the control unit is to monitor an output of the plurality of processing units for the tag.

25. A machine-readable medium that provides instructions, which when executed by a set of one or more processors, cause said set of processors to perform operations comprising:
  separating a serial data element stream having an original order into a plurality of segments;
  assigning each of the segments to a plurality of processing units for processing;
  inserting a tag in each segment indicating which processing unit contains the next segment in the original order; and
  merging the plurality of segments into the original order after processing based on the tag.

26. The medium of claim 25, wherein said inserting the tag includes performing one of:
  attaching the tag to a final data element in each of the plurality of segments; and
  placing the tag after the final data element.

27. The medium of claim 26 wherein the final data element is a branch instruction.

* * * * *